(12) United States Patent
Clark

(10) Patent No.: US 6,607,805 B1
(45) Date of Patent: Aug. 19, 2003

(54) BARBECUE GRILL GREASE CATCHER

(76) Inventor: Tom Clark, 2514 E. Willow St. Unit 302, Signal Hill, CA (US) 90806-6323

( * ) Notice: Subject to any disclaimer, the term of this patent is extended or adjusted under 35 U.S.C. 154(b) by 105 days.

(21) Appl. No.: 09/456,046

(22) Filed: Dec. 7, 1999

(51) Int. Cl.[7] .............................. B32B 3/10; A47J 37/08; B65D 1/34
(52) U.S. Cl. .......................... 428/131; 99/400; 99/446; 99/444; 99/425; 220/571; 220/572; 220/573
(58) Field of Search ........................ 99/400, 446, 444, 99/425; 220/571, 572, 573; 428/131

(56) References Cited

U.S. PATENT DOCUMENTS 4,512,044 A * 4/1985 Clark ............................ 4/581
5,868,270 A * 2/1999 Sandaj et al. ............... 220/571

\* cited by examiner

Primary Examiner—Terrel Morris
Assistant Examiner—Hai Vo
(74) Attorney, Agent, or Firm—John D. Gugliotta; Olen L. York, III; Michael J. Corrigan

(57) ABSTRACT

The invention is a rubber or plastic mat with four sidewalls for collecting the grease drippings from a conventional barbecue grill. The mat is placed on the ground and the grill is simply rolled onto the mat. Specially shaped grease barriers allow the wheels of the grill to be rolled over them to place the grill over the center of the mat.

3 Claims, 4 Drawing Sheets

BARBECUE GRILL GREASE CATCHER

RELATED APPLICATIONS

The present invention was first described in Disclosure Document No. 461617 filed on Sep. 2, 1999. There are no previously filed, nor currently any co-pending applications, anywhere in the world.

BACKGROUND OF THE INVENTION

1. Field of the Invention

The present invention relates generally to grease collection devices and, more particularly, to a grease collection mat for placement under the barbecue grill.

2. Description of the Related Art

Spending time in the great outdoors is among the most popular fair weather leisure time activities. Quite often, cooking and eating a meal is made part of the outdoor activity. Whether it is a family gathering, at a picnic or just having a cookout, a great deal of time is spent around a barbeque grill. While no one will deny that barbequing food adds a flavor that cannot be beat, it does have some disadvantages. Probably the most prominent disadvantage of barbequing is that it is messy, which usually isn't a major problem since it occurs outdoors. However, grease and other droppings from the grill and utensils may stain the surface the grill is placed on. Surfaces such as cement, asphalt, brick, wood and the like may be stained from such spills, and the only way to remove them is with strong chemical cleaners. Such cleaning cost money, time and runs the risk of damaging the surface as well as any nearby plant life. Accordingly, there exists a need for a means by which spills and drips that occur from barbeque cooking use can be contained in a quick, easy and effective manner such that driveways, patios, decks and the like are not stained or damaged. The development of the Barbecue Grill Grease Catcher fulfills this need.

In the related art, there exists some patents for devices designed to catch grease drippings from the grill area of a barbecue grill. However, these devices are designed to be placed directly beneath the grilling element. There are many disadvantages associated with devices of this type most notably being that the grill must be removed to insert the device. The prior art is completely void of any devices for catching grease drippings from a barbecue grill that is designed to placed beneath the grill between the ground and the grill.

A search of the prior art did not disclose any patents that read directly on the claims of the instant invention; however, the following references were considered related:

| U.S. Pat. No. | Inventor | Issue Date |
|---|---|---|
| 5,947,013 | Stewart, Jr. | Sep. 7, 1999 |
| 5,566,607 | Schleimer | Oct. 22, 1996 |
| 5,473,980 | Carpenter | Dec. 12, 1995 |
| 5,799,645 | Strader et al. | Sep. 1, 1998 |
| 4,909,137 | Brugnoli | Mar. 20, 1990 |
| 4,574,770 | Walls | Mar. 11, 1986 |
| 4,415,100 | Hutchinson | Nov. 15, 1983 |
| 842,695 | Peters | Jun. 19, 1905 |
| 4,936,202 | Lin | Jun. 26, 1990 |

SUMMARY OF THE INVENTION

It is therefore an object of the present invention to provide an improved grease collection apparatus for barbecue grills.

It is another object of the present invention to protects patios, decks, driveways, and the like from stains and spills.

It is yet another object of the present invention to make cleanup quick and easy.

It is yet still another object of the present invention to avoid costly cleaning or repair costs.

It is another object of the present invention to be easily cleaned with a hose if dirty.

It is a feature of the present invention to that it can be used for camping, cookouts and picnics.

It is a benefit of the present invention that it catches drips from cooking utensils too.

Briefly described according to the preferred embodiment of the present invention, an apparatus is provided catch droppings from a barbeque grill and associated food cooking operations. It is of a generally, large, rectangular, flat construction that allows the barbeque grill to be rolled upon it. Two of the four sides have a high curb to contain any spilled materials. The other two sides consists of a raised lip to facilitate the grill being rolled upon it. To use the invention, the user simply lays it flat upon the surface to be protected such as patios, driveways, decks or any surface. Next, the grill is rolled upon it and cooking commences in a normal manner. After cooking duties are finished, the user simply rolls the grill off, then hoses off any material that may have spilled. The invention is then stored away until next use. The use of the Barbecue Grill Grease Catcher allows for barbeque grilling without the worry of stained or dirty patios, driveways, decks and the like in a manner that is quick, easy and effective.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
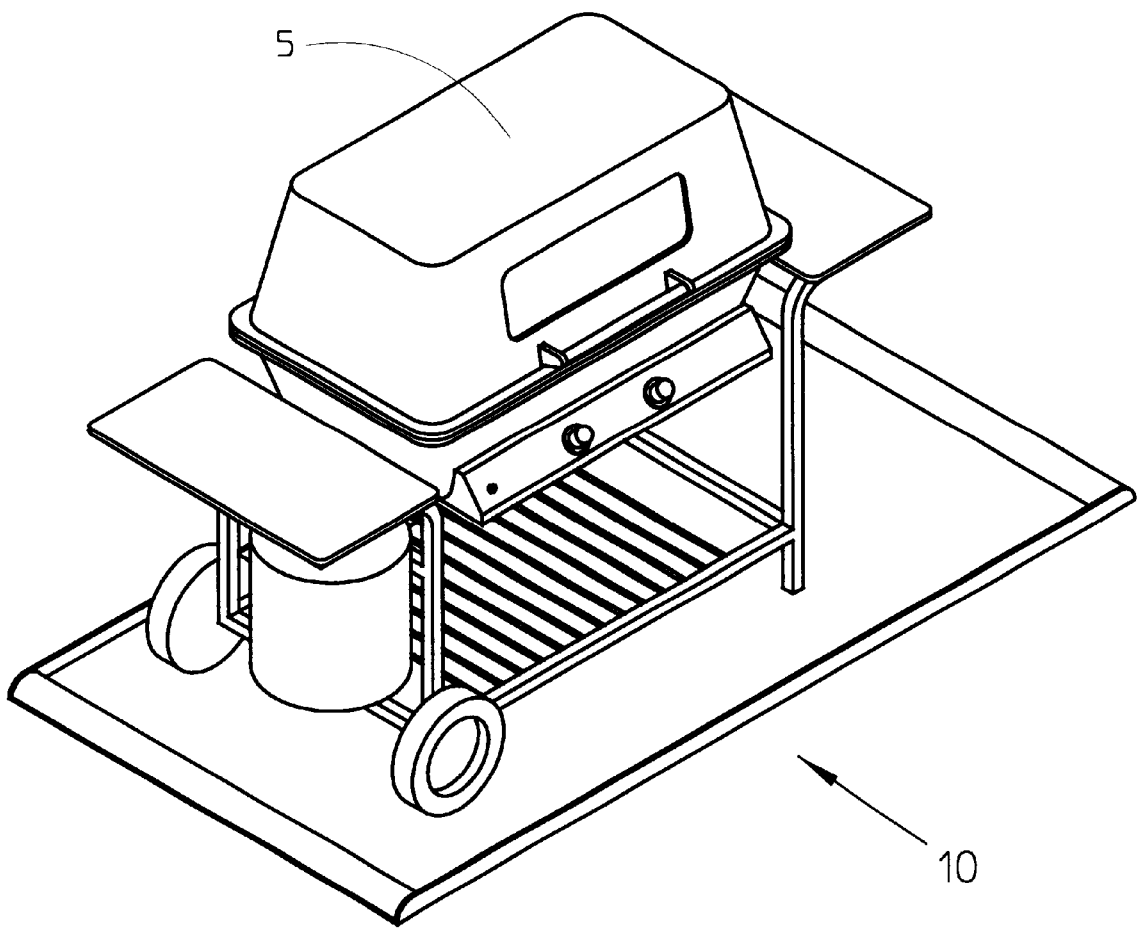
FIG. 1 is a front view of a Barbecue Grill Grease Catcher in its contemplated usage beneath a conventional barbecue grill, according to the preferred embodiment of the present invention.
Figure 2:
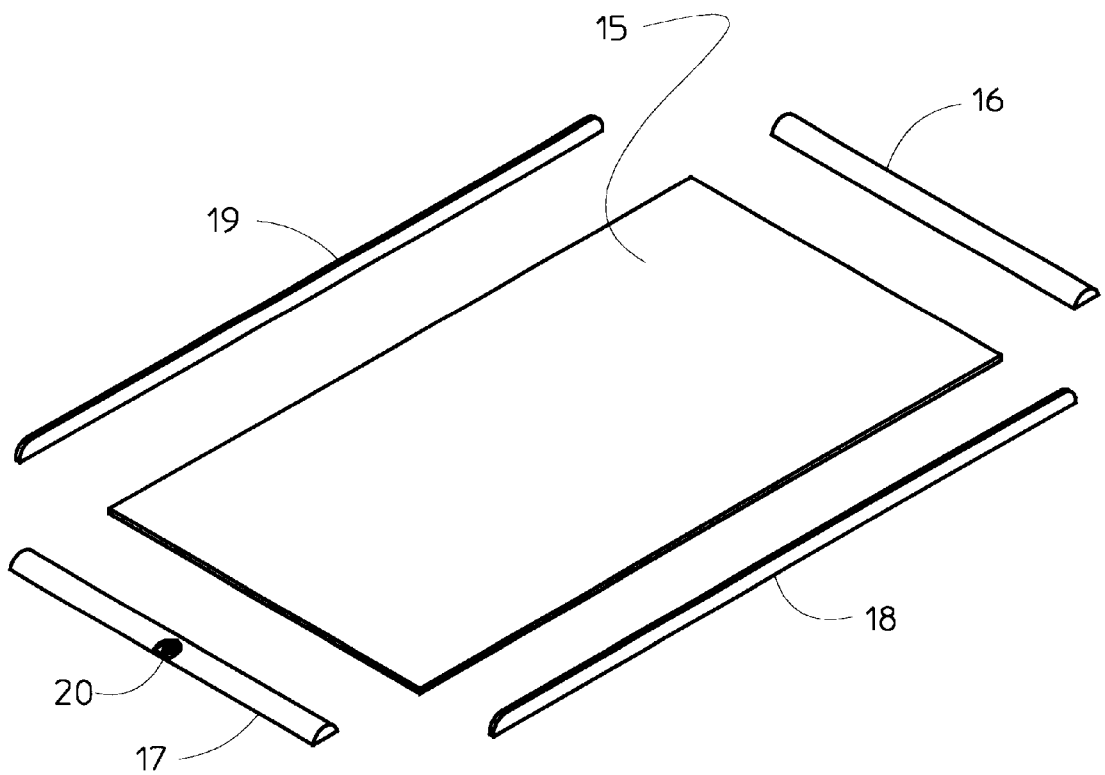
FIG. 2 is an exploded perspective view of a Barbecue Grill Grease Catcher, according to the preferred embodiment of the present invention.
Figure 3:
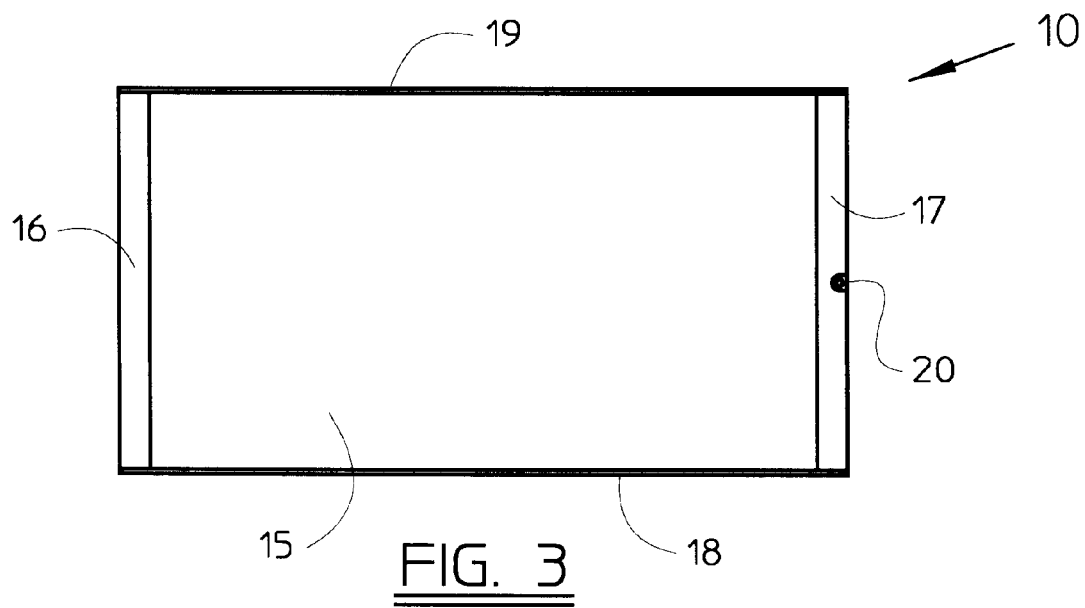
FIG. 3 is a top view of a Barbecue Grill Grease Catcher, according to the preferred embodiment of the present invention.
Figure 4:
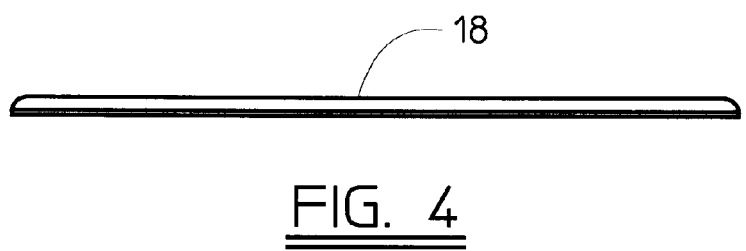
FIG. 4 is a front view of a Barbecue Grill Grease Catcher, according to the preferred embodiment of the present invention.
Figure 5:
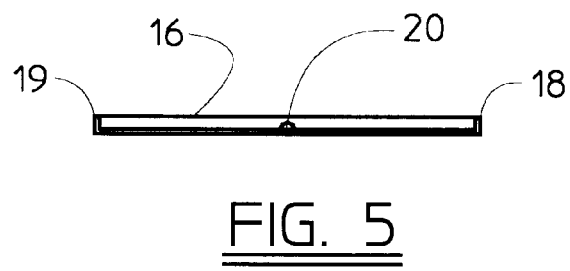
FIG. 5 is a left side view of a Barbecue Grill Grease Catcher, according to the preferred embodiment of the present invention.

| LIST OF REFERENCE NUMBERS | |
|---|---|
| 5 | Barbecue Grill |
| 10 | Barbecue Grill Grease Collector |
| 15 | Base Mat |
| 16 | Left Grease Barrier |
| 17 | Right Grease Barrier |
| 18 | Front Drip Edge |
| 19 | Rear Drip Edge |
| 20 | Aperture |

DESCRIPTION OF THE PREFERRED EMBODIMENTS

The best mode for carrying out the invention is presented in terms of its preferred embodiment, herein depicted within the Figures.

1. Detailed Description of the Figures

Referring now to FIGS. 1–5, a Barbecue Grill Grease Collector 10 is shown, according to the present invention, for collecting grease drippings and splatter as it falls from the grill surface of a conventional barbecue grill. Such drippings generally fall on the ground around the grill presenting an unsightly buildup and a safety hazard. Eventually, the drippings may ruin the material the grill is setting on such as a wood deck. By placing the Barbecue Grill Grease Collector 10 beneath the grill all of these problems are eliminated.

The Barbecue Grill Grease Collector 10 is comprised of a rubber or plastic mat with four sidewalls forming an open upper volume where grease drippings and splatter may accumulate and eventually be discarded. Base mat 10 is of a generally rectangular shape made from rubber or plastic sheeting. Fastened along the front and rear edges of base mat 15 are front drip edge 18 and rear drip edge 19 respectively, oriented vertically as shown. Fastened along the left and right edges of base mat 15 are left grease barrier 16 and right grease barrier 17, respectively. Left grease barrier 16 and right grease barrier 17 are strips of rubber or plastic having a semi-hemispherical cross-section to allow the wheels of the grill to easily roll over. Left grease barrier 16 and right grease barrier 17 as well as front drip edge 18 and rear drip edge 19 are made from plastic or rubber and attached to base mat 15 via adhesives or heat bonding methods. Whatever material chosen for each of the aforementioned parts must be fire, heat, grease, chemical and weather resistant. An aperture 20 is specially formed in a recess formed in the center of left grease barrier 20 to allow the device 10 to be hung from a nail or hook on a wall.

Figure 6:
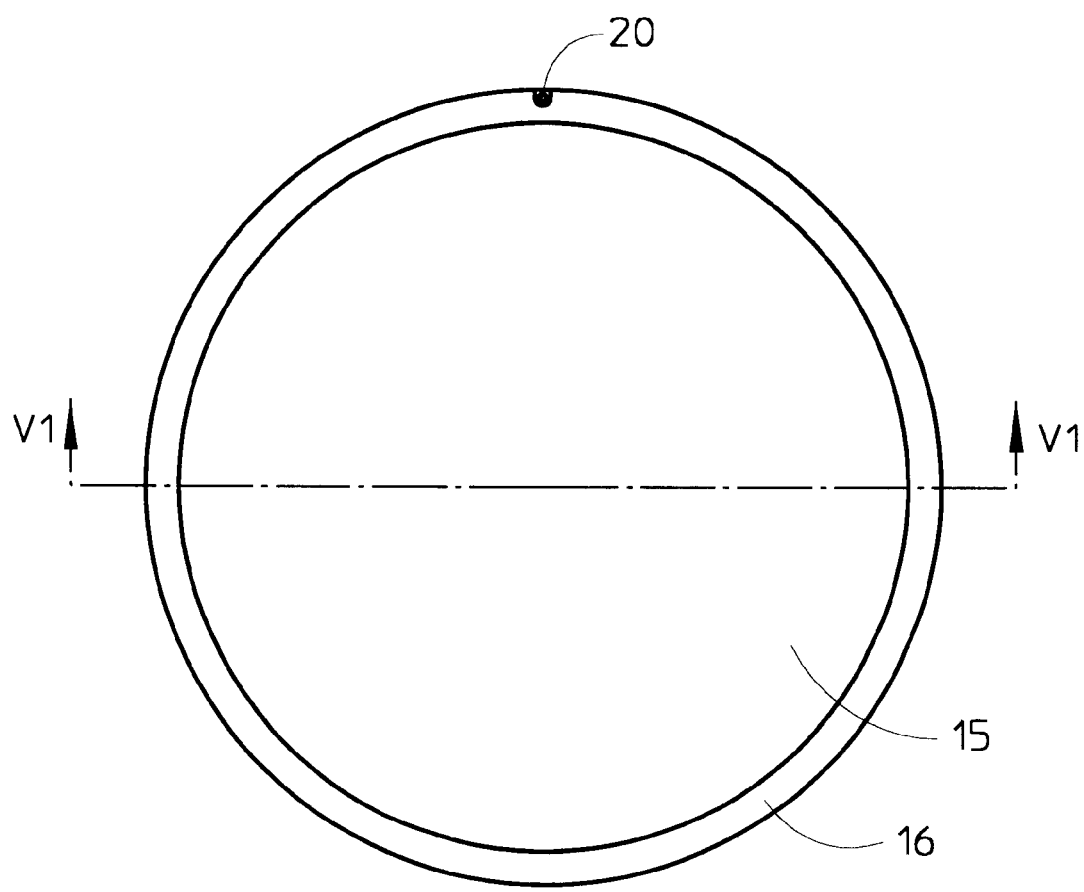
FIG. 6 is a top view of a Barbecue Grill Grease Catcher, according an alternate preferred embodiment of the present invention.
Figure 7:
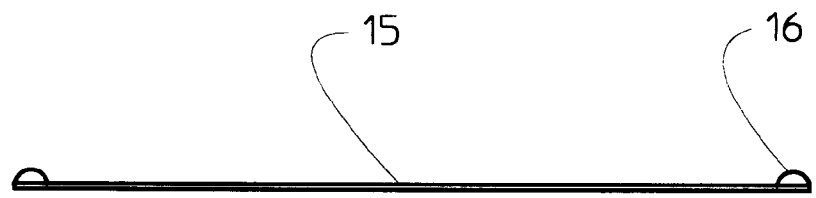
FIG. 7 is a cross-sectional view of a Barbecue Grill Grease Catcher taken along line VI—VI of FIG. 7, according an alternate preferred embodiment of the present invention.

Referring now to FIGS. 6 and 7, shown is an alternate preferred embodiment of the present invention, having a circular shape with a grease accumulation area in the center formed by a single circular grease barrier 16 permanently fastened around the perimeter of a base mat 15. Grease barrier 16 has a semi-hemispherical cross section to facilitate the wheels of a conventional barbecue rolling over it. A small aperture 20 specially formed in a recess formed in the outer edge of circular grease barrier 16 allows the device to be hung on a nail or hook on a wall.

2. Operation of the Preferred Embodiment

To use the invention, the user simply lays it flat upon the surface to be protected such as patios, driveways, decks or any surface. Next, the grill is rolled or placed upon it and cooking commences in a normal manner. After cooking duties are finished, the user simply rolls the grill off, then hoses off any material that may have spilled. A commercial de-grease solvent may be used to facilitate grease removal. The invention is then stored away until next use.

The foregoing description is included to illustrate the operation of the preferred embodiment and is not meant to limit the scope of the invention. The scope of the invention is to be limited only by the following claims.

What is claimed is:

1. An apparatus for placement underneath a barbecue grill for catching and collecting grease and splatter comprised of:
   a base mat, said base mat being of a generally rectangular shape;
   a front drip edge, said front drip edge fastened along the front edge of said base mat:
   a rear drip edge, said rear drip edge fastened along the rear edge of said base mat:
   a left grease barrier said left grease barrier, fastened along a left right edges of said base mat; wherein said left grease barrier is of a semi-hemispherical cross-section to allow the wheels of the grill to easily roll over;
   a right grease barrier, said right grease barrier fastened along a right edge of said base mat, wherein said right grease barrier are of a semi-hemispherical cross-section to allow the wheels of the grill to easily roll over; and
   wherein said front drip edge, said rear drip edge, said right grease barrier, said left grease barrier, and said base mat form an open upper volume where grease drippings and splatter may accumulate and eventually be discarded; and wherein further said left grease barrier, said right grease barrier, said front drip edge and said rear drip edge are attached to said base mat via adhesives or heat bonding methods, and wherein an aperture is specially formed in a recess formed in the center of said left grease barrier to allow said apparatus to be hung from a nail or hook on a wall.

2. An apparatus for placement underneath a barbecue grill for catching and collecting grease and splatter, comprised of:
   a base mat, said base mat having a circular shape;
   a single circular grease barrier, said circular grease barrier being permanently fastened around a perimeter of said base mat to form a grease accumulation area in a center of said apparatus; and
   wherein said circular grease barrier has a semi-hemispherical cross section to facilitate the wheels of a conventional barbecue rolling over it.

3. The apparatus of claim 2, wherein a small aperture specially formed in a recess formed in an outer edge of said circular grease barrier allows said apparatus to be hung on a nail or hook on a wall.

\* \* \* \* \*